United States Patent
Riddle et al.

(10) Patent No.: US 6,985,163 B2
(45) Date of Patent: *Jan. 10, 2006

(54) COLOR DISPLAY DEVICE

(75) Inventors: George Herbert Needham Riddle, Princeton, NJ (US); Glenn Reitmeier, Yardley, PA (US); Carl Charles Steinmetz, Mercerville, NJ (US); Ralph Anthony Stanziola, Neshanic Station, NJ (US); Herschel Clement Burstyn, Lawrenceville, NJ (US)

(73) Assignees: Sarnoff Corporation, Princeton, NJ (US); Algen Design Services Incorporated, Eatontown, NJ (US)

( * ) Notice: Subject to any disclaimer, the term of this patent is extended or adjusted under 35 U.S.C. 154(b) by 151 days.

This patent is subject to a terminal disclaimer.

(21) Appl. No.: 10/216,918

(22) Filed: Aug. 12, 2002

(65) Prior Publication Data

US 2003/0034985 A1    Feb. 20, 2003

Related U.S. Application Data

(60) Provisional application No. 60/312,290, filed on Aug. 14, 2001.

(51) Int. Cl.
*G09G 5/10* (2006.01)
(52) U.S. Cl. .................... 345/690; 345/591; 353/31
(58) Field of Classification Search ............... 250/226, 250/228; 359/834, 385; 362/516, 517, 518, 362/362; 345/32, 905, 584, 591, 593, 595, 345/596, 597, 204, 690, 589; 349/58, 62
See application file for complete search history.

(56) References Cited

U.S. PATENT DOCUMENTS

| 3,874,799 A | 4/1975 | Isaacs et al. ................. 356/173 |
| 4,171,909 A | 10/1979 | Kramer et al. ................. 356/73 |
| 4,366,407 A | 12/1982 | Walsh |
| 4,373,818 A | 2/1983 | Yamamoto et al. ......... 356/408 |
| 4,482,245 A | 11/1984 | Makabe et al. ............... 356/30 |
| 4,487,504 A | 12/1984 | Goldsmith .................. 356/323 |
| 4,562,461 A | 12/1985 | Yin |

(Continued)

FOREIGN PATENT DOCUMENTS

EP    0843487 A1    5/1998

(Continued)

OTHER PUBLICATIONS

PCT International Search Report, Dec. 11, 2002.

(Continued)

*Primary Examiner*—Kent Chang
(74) *Attorney, Agent, or Firm*—William J. Burke

(57) ABSTRACT

A color display apparatus and method for displaying colors using radiation sources uses displays that may include multiple radiation sources, a display surface and control hardware and software that enable accurate and reproducible color display. Another apparatus provides means for generating colors upon request and communicating digital information regarding the generation of the color spectrum to local or remote display devices. The apparatus may be used in selecting and ordering colors subject to supplier constraints. Methods for displaying colors and enabling display of the colors in remote locations, as well as methods for conducting business by communicating the color display information are all provided.

3 Claims, 10 Drawing Sheets

U.S. PATENT DOCUMENTS

| | | | |
|---|---|---|---|
| 4,654,794 A | 3/1987 | O'Brien | 364/413 |
| 4,690,560 A | 9/1987 | Coogan | 356/338 |
| 4,735,495 A | 4/1988 | Henkes | 350/345 |
| 4,800,375 A | 1/1989 | Silverstein et al. | |
| 4,881,811 A | 11/1989 | O'Brien | 356/323 |
| 4,956,702 A | 9/1990 | McQuade et al. | |
| 5,014,225 A | 5/1991 | Vidaver et al. | 364/550 |
| 5,321,448 A | 6/1994 | Ogawa | |
| 5,332,904 A | 7/1994 | Cannon | 250/372 |
| 5,339,151 A | 8/1994 | Shinn | 356/328 |
| 5,340,974 A | 8/1994 | Zalewski | 250/205 |
| 5,471,053 A | 11/1995 | Diner et al. | 250/228 |
| 5,495,429 A | 2/1996 | Craven et al. | 364/526 |
| 5,517,263 A | 5/1996 | Minich et al. | |
| 5,532,848 A | 7/1996 | Beretta | 358/504 |
| 5,626,409 A | 5/1997 | Nakayama et al. | |
| 5,726,719 A | 3/1998 | Tanaka et al. | |
| 5,806,950 A | 9/1998 | Gale | |
| 5,859,435 A | 1/1999 | Satake et al. | 250/341.7 |
| 5,917,561 A | 6/1999 | Hatanaka | |
| 6,008,905 A | 12/1999 | Breton et al. | 356/402 |
| 6,111,650 A | 8/2000 | Rawicz et al. | 356/402 |
| 6,259,430 B1 | 7/2001 | Riddle et al. | |
| 2002/0149546 A1 | 10/2002 | Moshe et al. | |
| 2004/0100589 A1 | 5/2004 | Ilan et al. | |
| 2004/0174389 A1 | 9/2004 | Ilan et al. | |
| 2004/0201598 A1 | 10/2004 | Ellav et al. | |

FOREIGN PATENT DOCUMENTS

| | | |
|---|---|---|
| GB | 2 282 928 | 4/1995 |
| JP | 8-272316 | 10/1996 |

OTHER PUBLICATIONS

"Liquid Crystal Display Three Panel Projector Using Three Primary Colors Light Emitting Diode Light5 Sources", IBM Technical Disclosure Bulletin, vol. 40, No. 4, Apr. 1997, pp. 201-205.

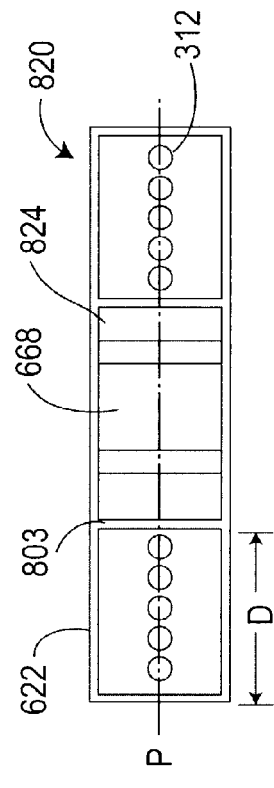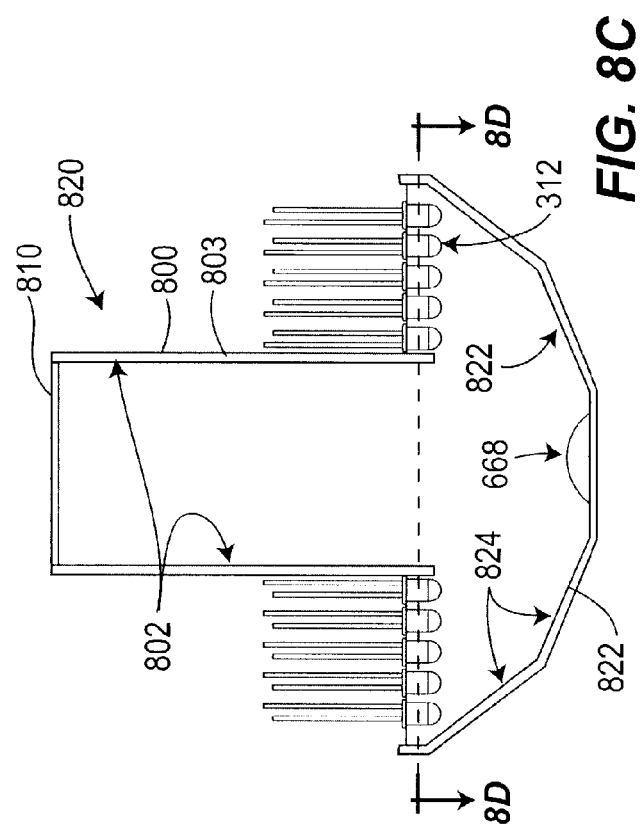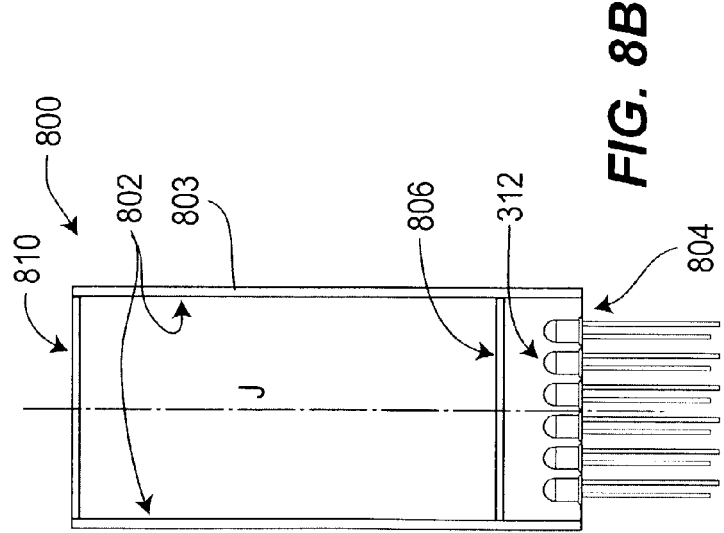

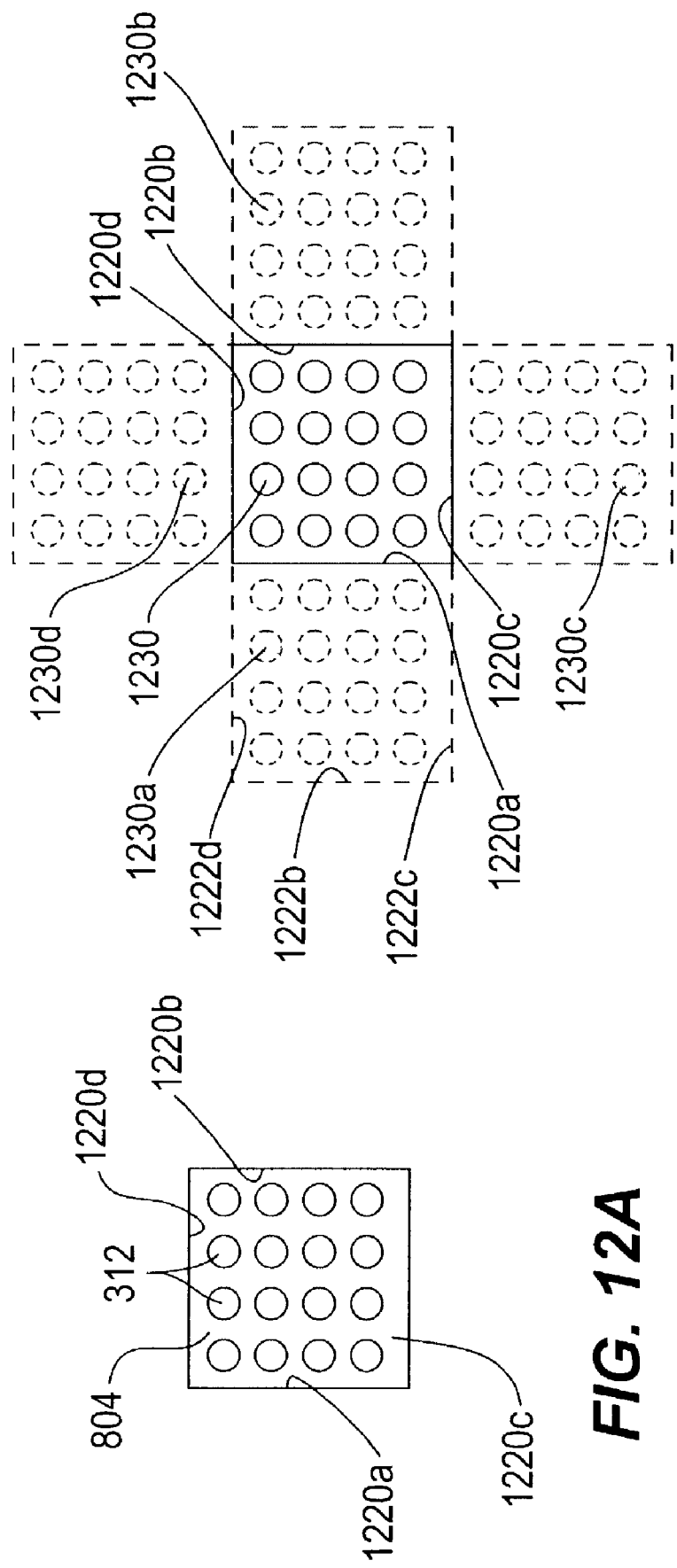

COLOR DISPLAY DEVICE

CROSS-REFERENCE TO RELATED APPLICATIONS

This application claims the benefit of U.S. Provisional Application No. 60/312,290 filed Aug. 14, 2001.

FIELD OF THE INVENTION

This invention relates to a color display and to a method for displaying color. In particular, this invention relates to a system for the production, communication and display of color.

BACKGROUND OF THE INVENTION

A wide gamut of colors can be generated and displayed by intermixing red, green, and blue primary light sources in different ratios. In general, a color that matches any particular color sample can be produced on a display using the three primary colors.

The ratios of the red, green, and blue primaries that produce a color that matches any particular sample, however, depend on the ambient light used to illuminate the color sample. Moreover, especially when only the three primary colors are used, it is possible to produce a color that some people see as a match to a sample, but that other people see as a mismatch. Colors that look alike in some ambient illuminations look different in other illuminations, and colors that look alike to some people look different to others. These phenomena are referred to as "metamerism."

Appearance of the color under given illumination depends on both the reflectance spectrum and the illuminance spectrum. Consequently, reproduction of the appearance of a color sample requires knowledge of both the complete reflectance spectrum and the complete illuminance spectrum. When these are known, the color can be reproduced by generating the spectrum that is the convolution of these two.

Perfect reproduction of a color requires control over the intensity level of each wavelength of the visible spectrum. In practice, the spectrum can be divided into a plurality of comparatively narrow bands, and the average intensity within each band can be specified. Thus, each band serves as a primary color. Using four or five such bands, or primary colors can significantly reduced metamerism, compared with the commonly used three primary colors. Using seven primaries reduces the metameric effects by an order of magnitude.

If the spectra selected for the different primary bands are narrow, then the primary colors will be intense and the color gamut that can be generated through a combination of the primaries will be large. Because a large color gamut is desirable, narrow-band primary colors are preferred.

The use of multiple narrow-band primary colors requires the use of multiple sources whose output intensity is accurately controlled and whose output is combined and displayed in a substantially uniform manner. A system for specifying, measuring, displaying, and communicating colors with reduced metameric confusion is described in U.S. Pat. No. 6,259,430 to Riddle et al., assigned to the assignee of this invention, and incorporated herein by reference. The '430 patent discloses several exemplary displays for using the invention, but there is still a need in the art for others that are particularly well suited to the practice of the invention. There is also a continued desire to develop novel and useful applications for the technology introduced by the '430 patent.

The problem of providing uniform illumination over a desired size target area using even a single light source is a vexing one. One known display 10 uses a set of integrating spheres in an arrangement such as shown in FIG. 1. A light source 11 in small integrating sphere 12 emits light which is sent into larger integrating sphere 16. Larger integrating sphere 16 has a display area 18, which is typically covered with a diffuser 22. A baffle 24 is typically used to shield the display area from the direct illumination of the source. One problem with this arrangement is that the source is located off to one side of the display area, which leads to asymmetries in the display because the light is introduced in an asymmetrical manner. This problem can be mitigated by making the sphere 12 larger compared to the size of the viewing window.

There is still a need for a display device, however, that will permit accurate reproduction of a light source with acceptable uniformity over a reasonable viewing area that approaches the diameter of the larger sphere. In particular, there is a need for displays and that will permit a user to effectively compare the color being displayed to the color of an actual sample in ways that are useful for applications where comparison with a precise color sample is desired.

SUMMARY OF THE INVENTION

A display apparatus comprising a prismatic structure having a front end, a back end, an interior space, an axis J intercepting both the front and the back ends is provided. At least one sidewall in a plane extends between the front and the back ends. The at least one wall comprises a reflective inner surface in the interior space, and an inner space outer perimeter in a plane is substantially perpendicular to the axis. The display apparatus further comprises a radiation emitter adapted to emit radiation having a desired wavelength spectrum; and a viewing window comprising a diffuse display surface located at the front end of the prismatic structure. Another embodiment of the display apparatus comprises a radiation diffuser positioned between the radiation emitter and the viewing window.

In another embodiment of the display apparatus, the radiation emitter emits radiation into the prismatic structure. The radiation emitter may comprise a plurality of distinct radiation emitting sources.

In an alternate embodiment, the display apparatus may further comprise means for receiving an input signal representing respective intensities of a multiplicity of wavelength bands; an intensity modulator, responsive to the input signal for generating a multiplicity of modulation control signals each corresponding to a respectively different one of the multiplicity of wavelength bands. The plurality of modulated radiation sources is responsive to the multiplicity of the modulation control signals and provides a plurality of radiation beams. Each of the beams corresponds to a respectively different one of the multiplicity of wavelength bands.

In another embodiment, the apparatus further comprises a color control system. The color system comprises means for monitoring characteristics of the radiation emitted from the radiation source at one or more wavelengths; and feedback means for comparing the monitored characteristics to a desired set of characteristics and adjusting the input signal to the intensity modulator to provide the desired set of characteristics. In yet another embodiment, the apparatus comprises means for displaying a reference color adjacent to a display surface.

Alternatively, the apparatus has the means for displaying a reference color which comprises an illumination source capable of providing illumination representative of environmental lighting, or the means for superimposing a texture image pattern on the display surface.

Another embodiment comprises a communication means for interfacing with a computer network.

In an additional embodiment, an apparatus for displaying a color comprises computer memory means having stored data therein corresponding to optical properties of one or more colorants; means for reading the stored data and combining the optical properties of the one or more colorants in response to a user-selected combination of colorants; means for generating an input signal representing respective intensities in a multiplicity of wavelength bands for producing emission spectra corresponding to the combination of colorants; means for receiving an input signal representing respective intensities of the multiplicity of wavelength bands; an intensity modulator, responsive to the input signal, for generating a multiplicity of modulation control signals each corresponding to a respectively different one of the multiplicity of wavelength bands; a multi-wavelength radiation source which provides a plurality of radiation beams, each corresponding to a respectively different one of the multiplicity of wavelength bands, the radiation source being responsive to the multiplicity of control signals to control each radiation beam in intensity to provide a multiplicity of modulated radiation beams; means for combining the modulated radiation beams to display the color; means for monitoring characteristics of the displayed color at one or more wavelengths; and a controller for comparing the monitored characteristics to a desired set of characteristics and adjusting the input signal to the intensity modulator to provide the desired set of characteristics.

In one embodiment, the means for combining the modulated radiation signals comprises a display apparatus comprising a prismatic structure having a front end, a back end, an interior surface, an axis J intercepting both the front and the back ends, at least one sidewall in a plane extending between the front and the back ends. The at least one wall comprising a reflective inner surface in the interior space, and an inner space outer perimeter are in a plane substantially perpendicular to said axis. The prismatic structure further comprises; a radiation emitter adapted to emit radiation having a desired wavelength spectrum; and a viewing window comprising a diffuse display surface located at the front end of the prismatic structure.

In yet another embodiment, a display apparatus comprises a light-conducting sheet having a periphery, a center, a back side, and a front side; and a plurality of radiation sources distributed about the periphery of the sheet and adapted to emit radiation toward the center. The back side of the sheet has a roughness sufficient to reflect the radiation toward a display surface on the front side of the sheet.

Another embodiment includes a method for displaying a color produced by mixing a plurality of individual colorants in a predetermined ratio. The method comprises the steps of providing a radiation spectrum for a color produced by each individual colorant; dividing the radiation spectrum into at least four wavelength bands; determining an intensity for each wavelength band; transmitting the intensities to a radiation source; selecting a narrow band of wavelengths in each of the wavelength bands; generating a multiplicity of beams of radiation, each beam of radiation essentially corresponding in wavelength to a selected narrow band of wavelengths and corresponding in intensity to the respective wavelength bands; and combining the beams of radiation to display the color.

In yet another embodiment, a display apparatus having a front and a back comprises a first reflector in the back of the display having a concave, reflective inner surface symmetrical about a first plane and having a first effective diameter; a second reflector in the front of the display having a concave, reflective inner surface symmetrical about the first plane and facing the first reflector, the second reflector having a second effective diameter smaller than the first effective diameter; a viewing window in the second reflector at the front of the device; a convex, reflective impinging surface mounted at the back of the first reflector facing the second reflector and symmetrical about the first plane; and one or more radiation sources positioned in an annular region between the first reflector and the second reflector and adapted to emit radiation toward the first reflector, the radiation reflecting off of the first reflector and optionally off of the impinging surface, toward the second reflector and ultimately to the viewing window.

Another embodiment includes a method of remotely displaying a color. The method comprises providing a radiation spectrum for a color produced by each individual colorant; transmitting the radiation spectrum to a remote location to display the color; dividing the radiation spectrum into at least four wavelength bands; determining an intensity for each wavelength band; generating a multiplicity of beams of radiation, each beam of radiation essentially corresponding in wavelength to one of the wavelength bands and corresponding in intensity to the respective determined intensity; and combining the beams of radiation to display the color.

Yet, another embodiment is a method of doing business comprising generating a digital data set for a color spectrum; and transmitting the digital data set to a display device available to the requester.

BRIEF DESCRIPTION OF THE DRAWINGS

FIG. 8A is a cross-sectional illustration of an exemplary prismatic structure display embodiment of the invention.

FIG. 8B is a longitudinal section illustration of the prismatic structure display embodiment of FIG. 8A.

FIG. 8C is a cross-sectional illustration of another prismatic structure display embodiment of the invention.

FIG. 8D is a longitudinal section illustration of the prismatic structure display embodiment of FIG. 8C.

FIG. 12A is a plane view of an exemplary distribution of light sources in a prismatic structure.

FIG. 12B is a schematic illustration of the virtual images created by the structure of FIG. 12A.

DETAILED DESCRIPTION OF THE INVENTION

The exemplary display devices of this invention are particularly useful in a color system for displaying colors by projecting radiation onto a display device. The projected radiation is defined by the intensity of each of a multiplicity of radiation bands, each band of which has a respectively different wavelength. In preferred embodiments, at least four, and preferably more than seven, more preferably eight to ten, beams of radiation may used to display a particular color. The intensity of radiation within each beam can be varied to produce any desired spectrum within the resolution of the bands used to display the color. All operations are preferably under digital control.

Figure 2:
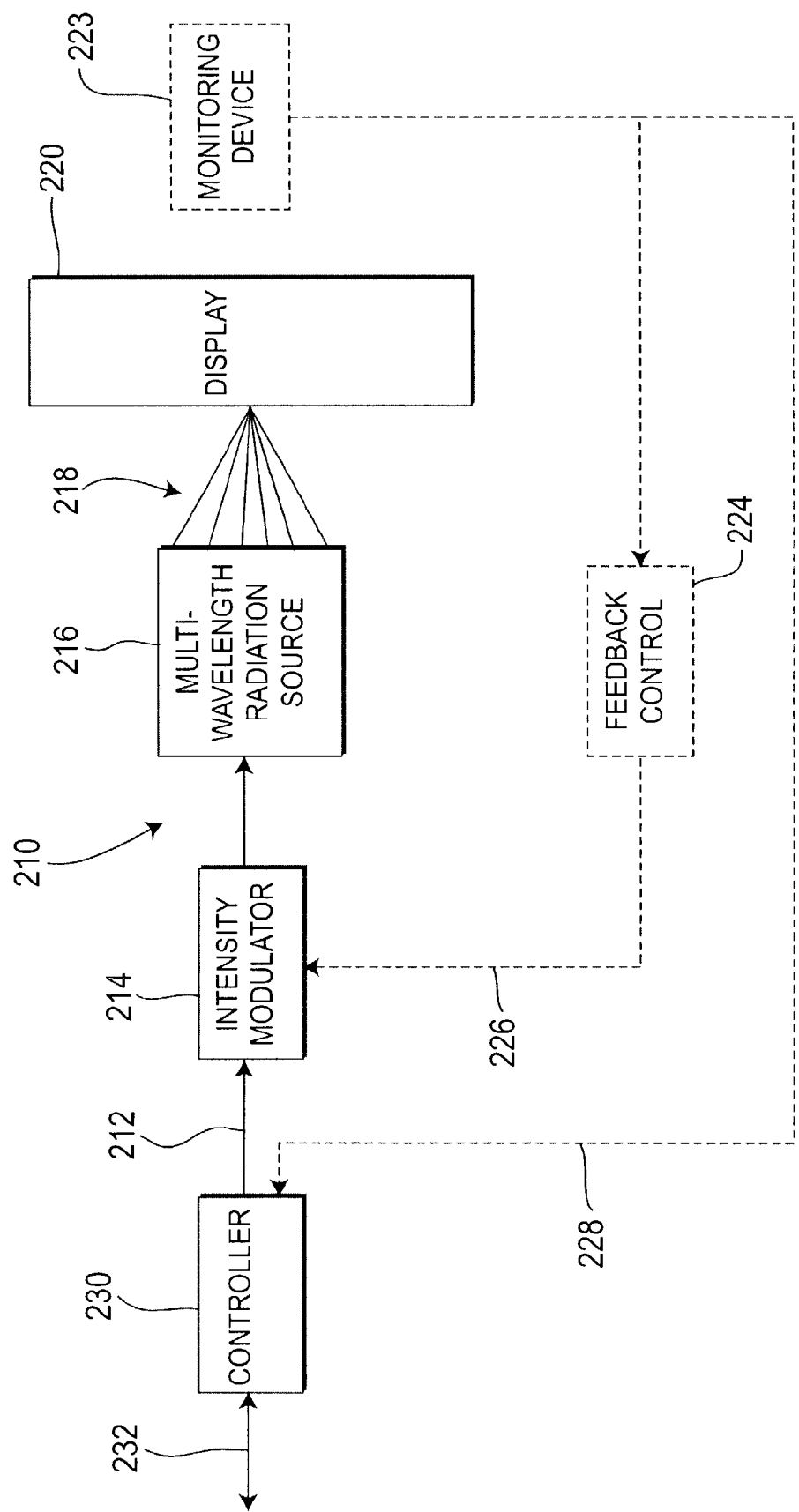
FIG. 2 is a schematic representation of a color display system according to the invention.

FIG. 2 is a schematic representation of a color display system according to the present invention. Color display system 210 receives input signals 212 to an intensity modulator 214. The modulator 214 controls the intensity of each selected wavelength of each beam of radiation generated by the multi-wavelength radiation source 216. Exemplary apparatus suitable for use as the modulator 214 is described below with reference to FIGS. 3–9. Beams of radiation 218 are combined and displayed by display device 220, which may comprise a screen 222. Also shown are optional monitoring device 223 and feedback control means 224, that may be used to provide improved control of the radiation intensity in the radiation beams.

A process for determining the radiation and reflectance spectrum of an object using a measuring device is described in the '430 Patent. The radiation or reflectance spectrum for the object may used directly to provide input to the color display from the measuring device or, once determined, it may be stored electronically, such as in a computer memory or other electronic storage device, and used when desired. For example, the optical properties associated with various individual colorants, such as pigments or dyes, such as are used to make colored paints, plastics, textiles, cosmetics, and the like, may be collected and stored.

The '430 patent, incorporated by reference, discusses the benefit, for reproduction of color, of breaking the visible color spectrum down into a number of bands, such as at least four, and preferably at least seven such bands, and choosing a plurality of individual light sources, each in one of the different bands. For the displays of the present invention, a range of eight to ten bands is most preferred. The '430 patent also discusses a number of different types of light sources that may be used for producing the radiation, any of which may be used with respect to this invention. For simplicity, however, this disclosure primarily discusses embodiments wherein radiation source 16 as shown in FIG. 2 comprises a multiplicity of light emitting diodes (LEDs), each of which emits a characteristic visible wavelength spectrum that is substantially constant. Each LED emits a wavelength spectrum that corresponds to one of the wavelength bands. The radiation source comprises at least one LED corresponding to each wavelength band.

Thus, several LEDs emit spectra in several bands, and it is likely that these spectra and the corresponding bands will overlap. That is, an orange LED may emit light with a peak intensity at a wavelength of 620 nm, with a half-width of about 20 nm, and with significant radiation extending 50 nm either side of the peak. A yellow LED may emit light with a peak intensity at a wavelength of 590 nm, with a half-width of about 20 nm, and with significant radiation extending 50 nm either side of the peak. In this case there is substantial overlap between the orange and the yellow bands. It is desirable that the light source used for each band have a bandwidth approximately equal to the separation between the centers of adjacent bands so that the spectra formed by the combination of the different bands is relatively smooth. It is further desirable to have narrow bands for the different primary sources, so that they have high chromaticity and thereby enable the display of a large gamut of colors. These needs, in addition to the desirability of minimal metamerism, favor the use of a large number of primary colors.

Typically, a set of multiple, substantially identical LEDs are used for each band, both to provide more light than a single LED can provide, and to provide uniformity of light across the display surface. To promote uniformity of light across the display surface, the several LEDs should be positioned within the display apparatus with the proper symmetry, the proper symmetry depending on the embodiment of the system. The intensity of the each LED or each set of substantially identical LEDs essentially corresponds to a respective one of the signals transmitted to the intensity modulator 214. Organic LEDs, or any of the other radiation sources known in the art, in particular those discussed in the '430 patent, may also be used.

Spherical Embodiments

Figure 3:
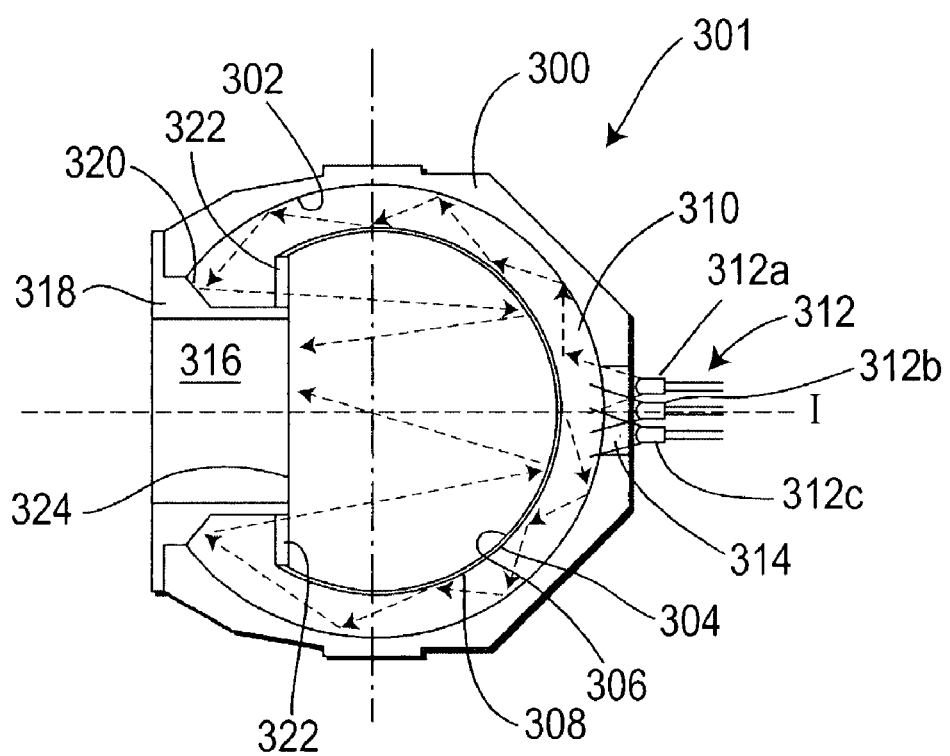
FIG. 3 is a longitudinal section illustration of an exemplary display apparatus of the invention having an inner sphere that is greater than a hemisphere.

In one embodiment of the invention, shown in FIG. 3, display apparatus 301 comprises at least a partial outer sphere 300 having a polar axis of rotation I and a reflective inner surface 302. At least a partial inner sphere 304 is mounted within outer sphere 300 along polar axis I. Inner sphere 304 has a reflective inner surface 306 and a reflective outer surface 308. Reflective outer surface 308 of inner sphere 304 and reflective inner surface 302 of outer sphere 300 create a radiation path 310. The reflective surfaces may be mirrored specular reflecting surfaces, but are preferably white diffusely reflecting surfaces because white surfaces provide more effective light mixing.

Figure 1:
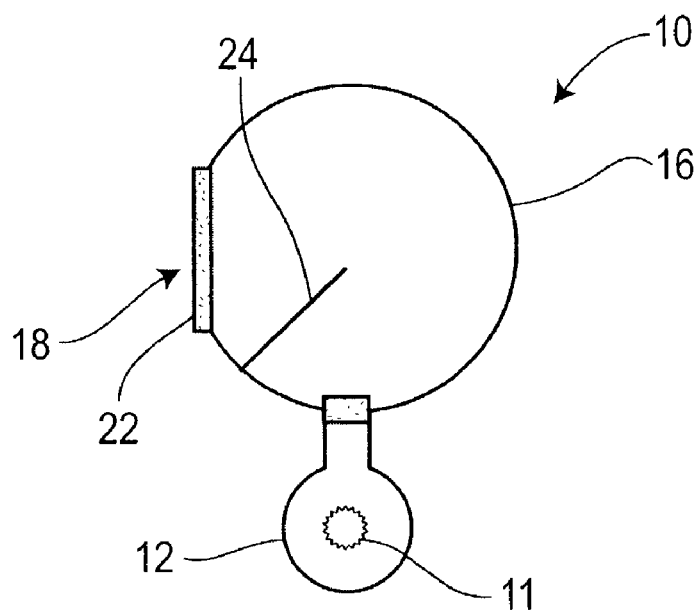
FIG. 1 is an illustration of a display of the prior art.

One or more radiation sources 312 are adapted to introduce one or more beams 314 of radiation into radiation path 310. A viewing window 316, located along polar axis I, extends through outer sphere 300 to inner sphere 304. Viewing window 316 is surrounded by a sidewall 318 extending from outer sphere 300 to inner sphere 304. A reflective surface 320 on the inner surface of sidewall 318 reflects radiation incident thereon from radiation path 310 into the inner sphere 304. The inner sphere 304 is supported within the outer sphere 300 by a transparent radiation entry portal 322 which allows the radiation to be transmitted into inner sphere 304. The inner sphere 304 reflects the radiation onto a display surface 324 located in the viewing window substantially perpendicular to polar axis I. The arrangement of inner and outer spheres in display surface 300 shown in FIG. 3 allows for a viewing window 316 and display surface 324 that approaches the inner sphere diameter yet still maintains a uniform color distribution, as opposed to the need in the prior art system of FIG. 1 to increase the size of sphere 12 relative to the viewing window and display 18.

As shown in FIG. 3, radiation sources 312 comprise a multiplicity of narrow-band radiation beam sources 312a, 312b, and 312c, such as light emitting diodes (LEDs) that are located essentially on or around polar axis I. Placement of the sources essentially on the axis assures radial symmetry of the color pattern on display surface 324. As shown in FIG. 3, inner sphere 304 is also located concentrically within outer sphere 300. In other embodiments, the inner sphere may not be concentric with the outer sphere. Non-concentric arrangements are particularly desirable for manipulating the angular spread of the rays entering the radiation path when reflective surfaces, such as LaGrange invariant or etendu preserving environments, are used.

As shown in FIG. 3, display surface 324 is located at an inner end of viewing window 316 adjacent inner sphere 304, but the display surface may be located anywhere between the inner and outer ends of viewing window 316. Moving the display surface back and forth between the ends of the viewing window enables adjustment of the energy density distribution on the surface. Viewing window 316 typically has a cylindrical shape, but may also have other geometries. Also shown in FIG. 3, inner sphere 304 is larger than a hemisphere. In another display embodiment 401 shown schematically in FIG. 4, inner sphere 404 may be only a hemisphere, or in other embodiments (not shown), less than a hemisphere. Using more than a hemisphere tends to provide a more uniform radial density function (the energy per area measured at each radius of the circular display surface). In the embodiment shown in FIG. 4, sidewall 418 inner surface 420 is in the shape of a truncated cone extending radially from outer sphere 400 to the inner end 417 of the viewing window 416.

Figure 4:
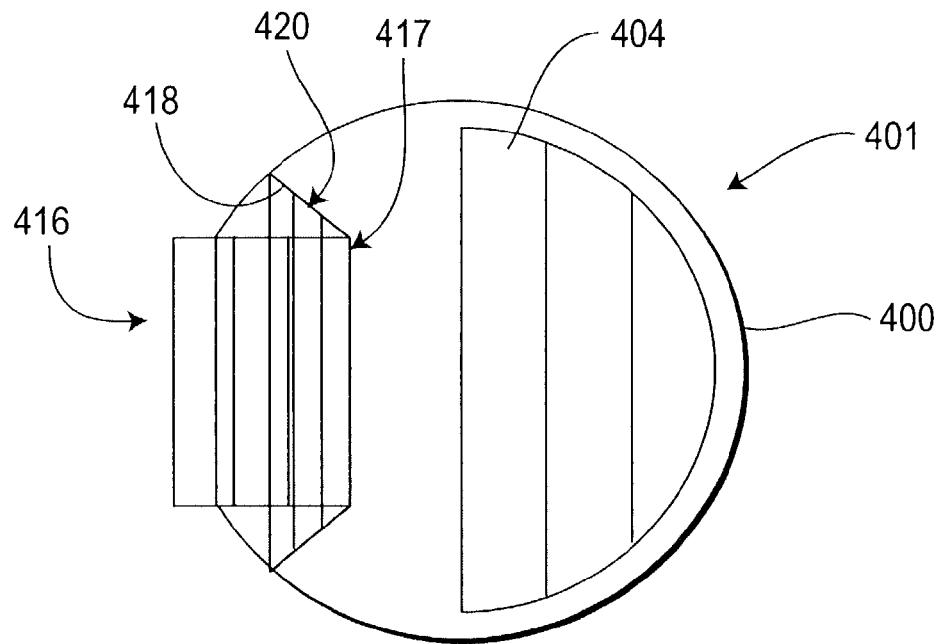
FIG. 4 is a schematic illustration of another exemplary display apparatus of the invention having an inner sphere that is a hemisphere.
Figure 5:
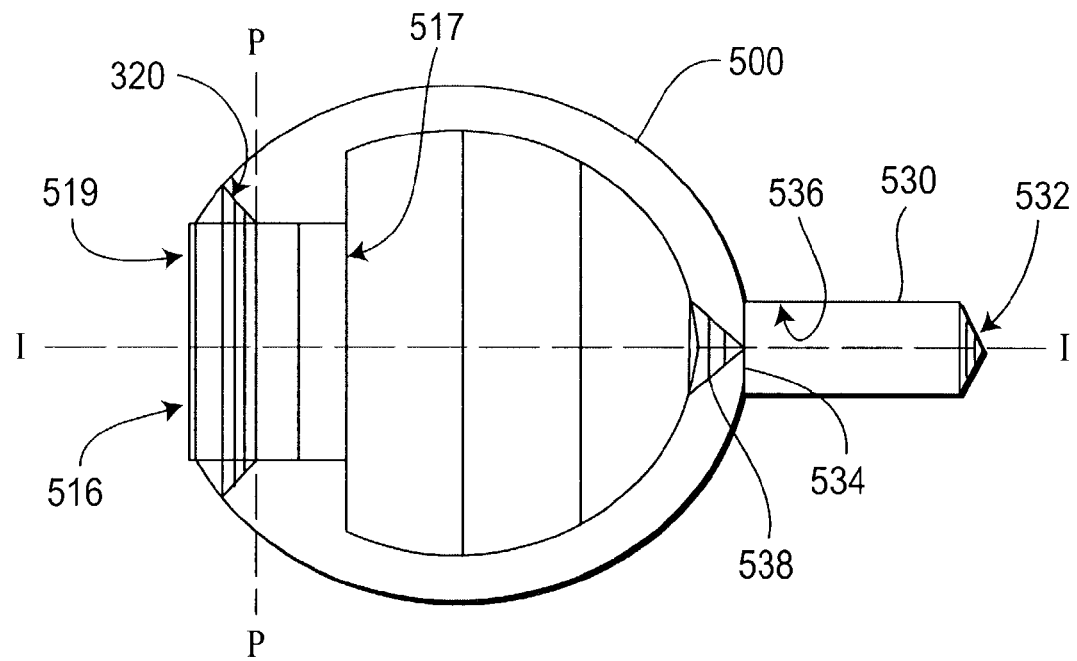
FIG. 5 is a schematic illustration of yet another exemplary display apparatus of the invention having a lamp housing extension.

As shown in FIGS. 3–5, inner reflective surface 320 of viewing window sidewall 318 has a truncated conical shape. Referring to the embodiment shown in FIG. 5 (but also true of the embodiment shown in FIG. 3), the truncated cone that forms sidewall inner surface 320 extends from the outer sphere to a plane that is between the inner end 517 and the outer end 519 of viewing window 516. The sidewall inner surface is not limited to a truncated cone geometry, however, and may have any geometry effective for reflecting the radiation into the inner sphere.

FIG. 5 also shows a lamp housing 530 extending along polar axis I from outer sphere 500. This use of a lamp housing 530 is advantageous because it allows numerous radiation sources (not shown) to be used at the back end 532 of the lamp housing without severely impacting the radial symmetry of the light distribution. The front end 534 of lamp housing 530 may comprise a hole concentric with polar axis I, and the inner walls 536 of lamp housing may be reflective to provide a radiation signal 538 characteristic of a single point source rather than the multiple point sources present at the back of the lamp housing.

Figure 6A:
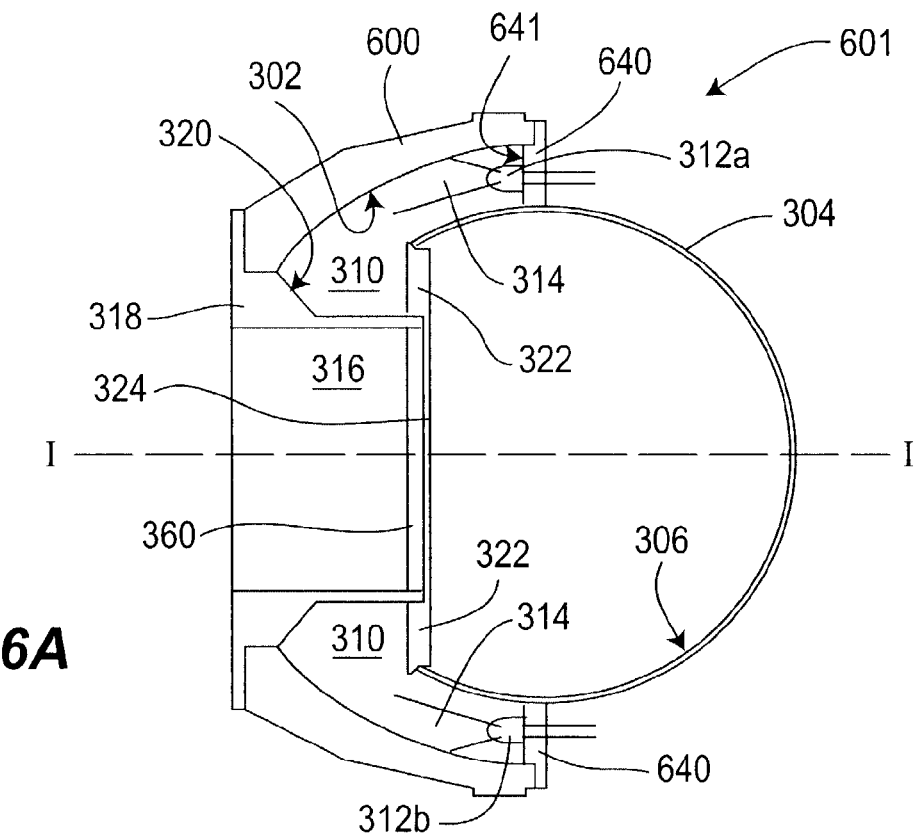
FIG. 6A is a longitudinal section illustration of an exemplary display apparatus of the invention having only a partial outer sphere extending from the viewing window.

In yet another embodiment 601, shown in FIG. 6A, outer sphere 600 may extend only partially around inner sphere 304 from the viewing window sidewall 318 to a circle concentric with the polar axis I. An annular wall 640, preferably having a reflective inner surface 641, extends radially between outer sphere 600 and inner sphere 304. A multiplicity of narrow-band radiation beam sources 312a and 312b are mounted in annular wall 640 to introduce the radiation beams 314 into radiation path 310 through the wall. Preferably at least three, and more preferably at least four different narrow-band radiation beam sources 312a and 312b that correspond to a single wavelength band are positioned symmetrically about the polar axis I in order to promote uniformity of light at the display surface 324. In the embodiment shown in FIG. 6A, the outer sphere extends to the equatorial circle that is located along a plane that bisects the inner sphere at its diameter along a plane perpendicular to polar axis I.

Figure 6B:
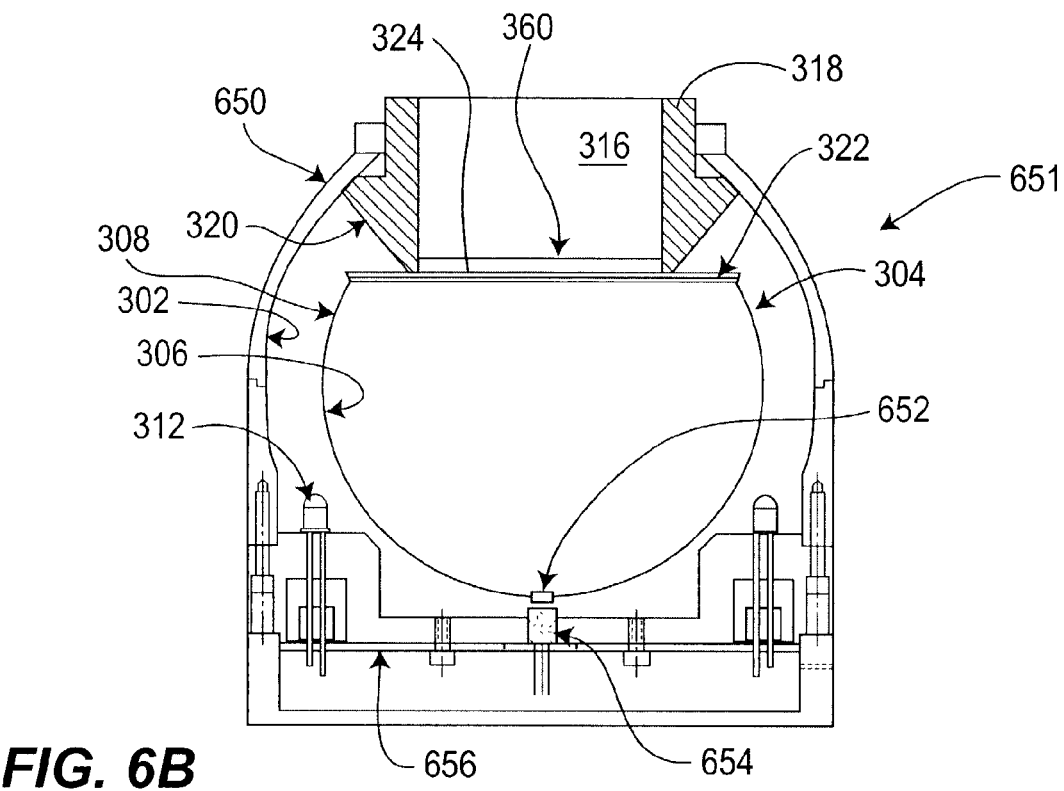
FIG. 6B is a longitudinal section illustration of another exemplary display apparatus having only a partial outer sphere extending from the viewing window.

In another embodiment 651, shown in FIG. 6B, outer sphere 650 extends to a circle that is farther back along polar axis I than the equatorial circle. Also shown in FIG. 6B is a diffusing surface 652 with a sensor 654, such as a photosensor, for example a PIN diode, behind the window to be used for sensing the light in the sphere and providing feedback control, as discussed herein later. In the alternative, sensor 654 may be a spectrometer, or a fiber-optic pickup leading to a spectrometer may be located in place of sensor 654. LEDs 312 and sensor 654 may be mounted on circuit board 656 and connected electrically in a circuit along with various electronics, such as those necessary to carrying out the method described in detail in the '430 Patent. The reflecting inner surface 302 of outer sphere 650, inner surface 320 of sidewall 318, outer surface 308 and inner surface 306 of inner sphere 304 are preferably white.

The embodiments shown in FIGS. 6A and 6B have several advantages over the embodiment shown in FIG. 3. First of all, there is more area for mounting a multiplicity of radiation sources around the perimeter wall than at the back of the sphere. The radiation throughput is greater in the embodiment shown in FIGS. 6A and 6B because of the shorter radiation pathlength relative to the embodiment shown in FIG. 3. The construction cost and complexity is also reduced because the rear outer hemisphere is eliminated. In particular, because all of the surfaces hit by radiation are typically coated with a high-reflectance material in a costly process, the elimination of the back half of the outer sphere eliminates the need for this reflective coating on the back portion of the inner sphere as well.

Figure 6C:
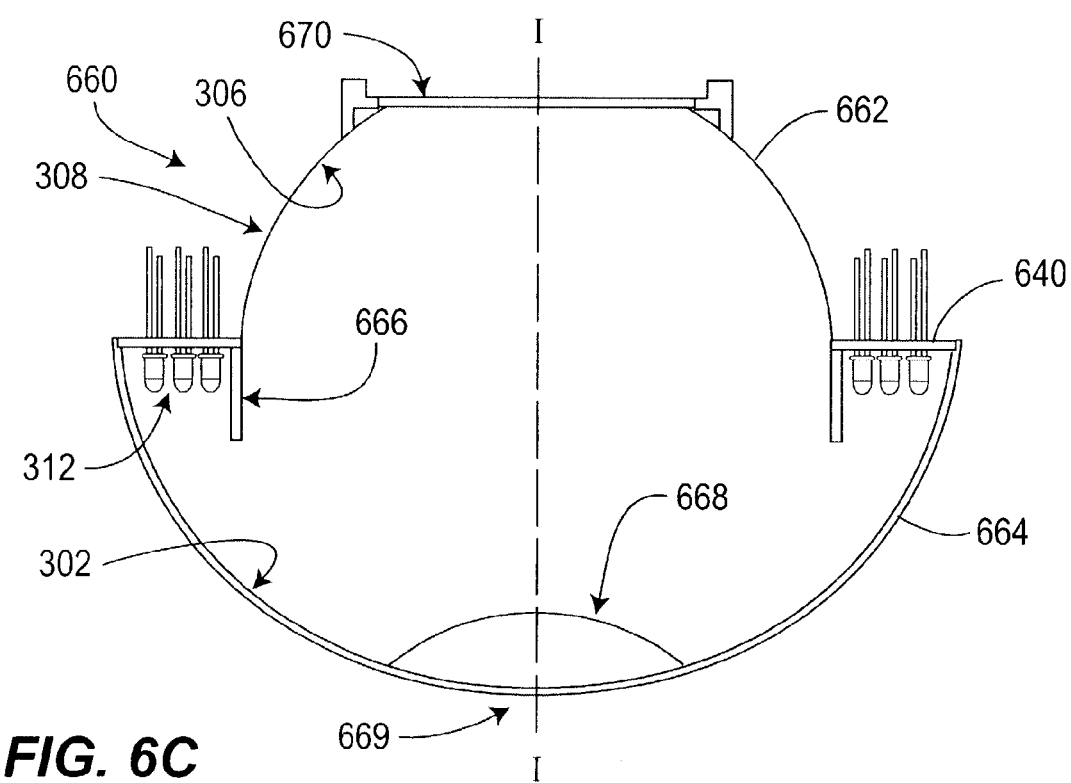
FIG. 6C is a longitudinal section illustration of another display embodiment of the invention.

In yet another display embodiment 660, shown in FIG. 6C, the relationships between inner sphere 662 and outer sphere 664 and the corresponding light path are different. As shown in FIG. 6C, LEDs 312 are mounted on annular wall 640 which connects the inner surface 302 of outer sphere 664 to outer surface 308 of inner sphere 662. Multiple LEDs 312 are distributed about the polar axis I on perimeter wall 640. As described above, LEDs 312 comprise at least four, and preferably seven or more different types of LEDs, each type corresponding to a respective band of the visible spectrum. It is further preferred that at least three substantially identical LEDs of each type be symmetrically distributed about polar axis I. A cylindrical shield 666 with a diameter equal to that of the inner sphere is mounted concentric with polar axis I around LEDs 312. Light from LEDs 312 is reflected off of outer sphere 664 inner surface 302 and shield 666 toward impinging surface 668 at the back 669 of the outer sphere. The light reflects off of impinging surface towards diffuse viewing window 670. Impinging surface 668 has rotational symmetry along polar axis I, serves to increase the amount of light reaching the central regions of viewing window 670. Shield 666 serves to prevent light from LEDs 312 and the first reflection of the LED light on outer sphere 664 from traveling directly to viewing window 670, thereby enhancing the uniformity of light across the viewing window. The shield also tends to increase the amount of light reaching the outer regions of the viewing window. Proper design of the shield and the impinging surface enables a highly uniform distribution of light across the viewing window.

Although shown in FIG. 6C with shield 666 being cylindrical, impinging surface 668 being spherical, inner sphere 662 being spherical, and outer sphere 664 being spherical, other geometries may be used. For example, shield 666 may have a truncated conical shape tapering or flaring toward the back 669 of outer sphere 664. Impinging surface 668, inner sphere 662, and outer sphere 664 may not be spherical at all, but rather elliptical parabolic, conical, or of some other shape, preferably symmetric, more preferably rotationally symmetric, about polar axis I. Any combination of geometries may be used.

The design shown in FIG. 6C is advantageous because it allows for approximately twice the throughput of light as compared to the design in FIG. 6B. Moreover, this design has fewer parts, is easier to assemble, and is therefore less expensive to produce. Also, viewing window 670 is on the surface of the structure rather than recessed in a cavity such as the viewing windows (316, 416, 516) shown in FIGS. 3–6B.

Figure 7:
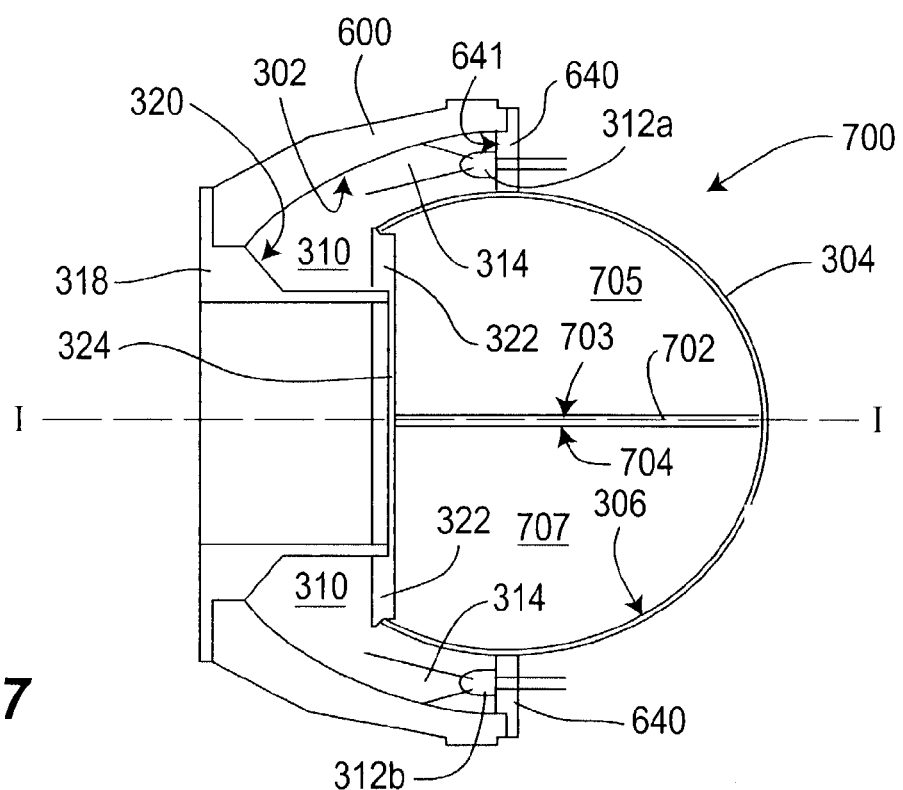
FIG. 7 is a longitudinal section illustration of an exemplary display apparatus of the invention having a partial outer sphere and having a plurality of segments.

The displays shown in FIGS. 6A–C can be modified to create a segmented display 700, as shown in FIG. 7. The segmented display comprises at least one diametrical divider 702 along a plane co-linear with the polar axis I that splits inner sphere 304 and outer sphere 600 into a plurality of segments. Although not shown splitting outer sphere 600, divider 702 may comprise multiple components: the inner component shown inside inner sphere 304, and an outer component (not shown) extending along the same plane as the inner component from inner sphere 304 to outer sphere 600. Each divider 702 has opposite, reflective, planar surfaces 703 and 704, and each segment created by the divider has its own radiation source, such as a multiplicity of LEDs identical to each segment. Surfaces 703 and 704 may be diffusely reflecting, such as a white surface, or specularly reflecting, such as a mirrored surface. The segmented display enables display of one color on one side and a different color on the other side. Although shown with only a single divider creating two segments in FIG. 7, the display may have any number of segments. Although diametrical divider 702 extends across the entire diameter of the spheres, subsequent dividers may be radial dividers extending from the diametrical divider to the outer sphere.

Prismatic Embodiments

In an alternative embodiment, the display can be fabricated as a prismatic structure 800, such as a rectangular prism shown in FIGS. 8A and 8B. Prismatic structure 800 may comprise any polygonal prism or cylinder, preferably a right rectangular, triangular, or hexagonal prism, with at least a front end and a back end. Inner surfaces 802 of walls 803 of the prism 800 are reflective, having either diffuse white or preferably specular mirrored surfaces. Light is introduced into back portion 804, such as by LEDs 312. Particularly if the prism cross section is a rectangle or a regular triangle or hexagon, the reflective walls 802 make the prism appear as it if were infinitely broad, with light sources all across its breadth, so that if the walls 803 are sufficiently long, the light reaching display surface 810 is substantially uniform in directions normal to axis J. The prism length required for a given level of uniformity depends, inter alia, on the size of the prism ends, the distribution of the light emitted at the back end, specifically at the diffuser 806, and on the reflectivity of the mirrored walls.

The radiation from many LED sources tends to form a narrow beam rather than a Lambertian distribution. Because a narrow beam is not conducive to uniformity of illumination at the viewing surface 810, at least one diffuse surface 806 is positioned within the structure to scatter the light into an essentially Lambertian distribution and thereby enhance the uniformity of the light distribution at the viewing surface 810.

Figure 12C:
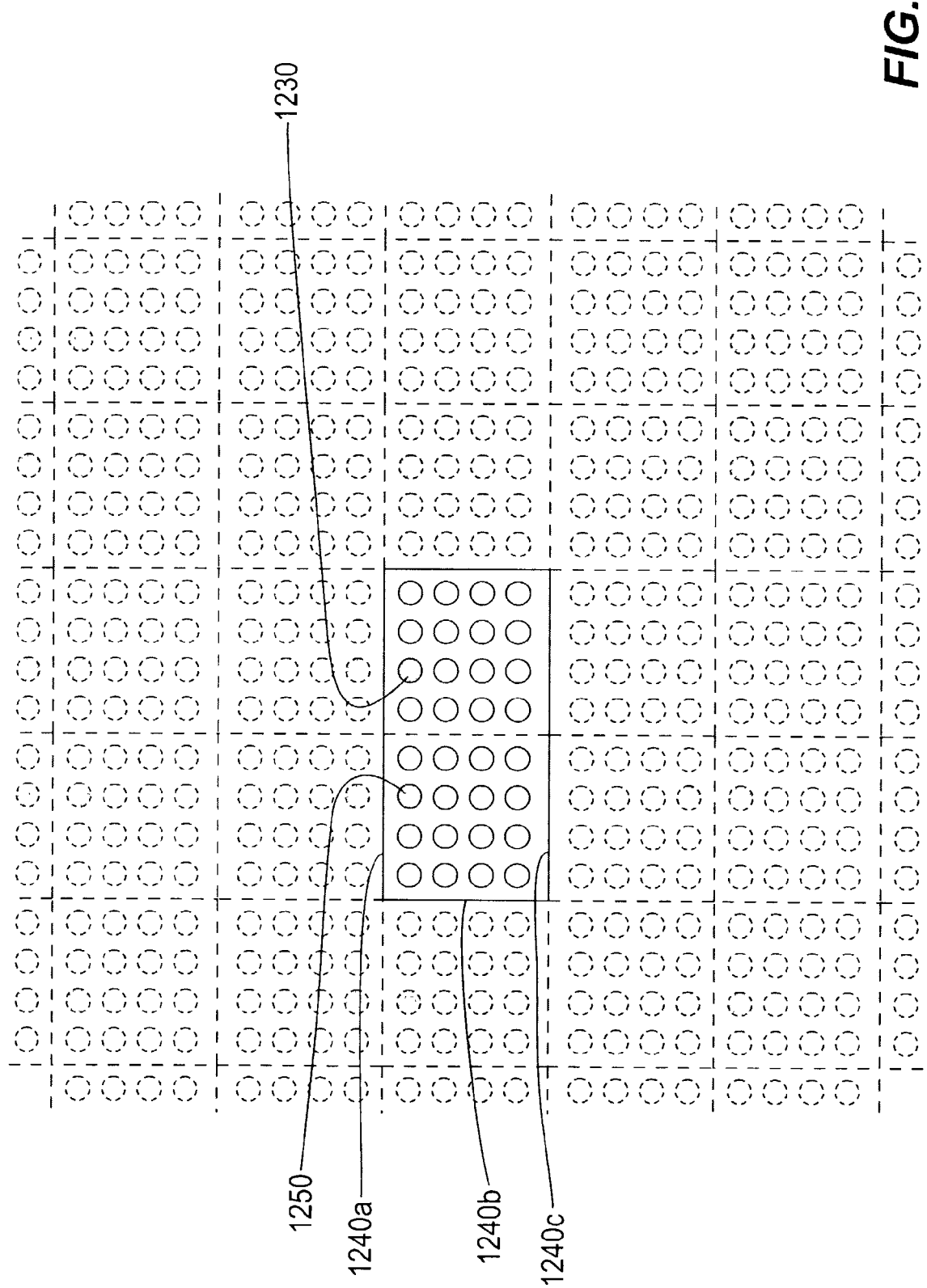
FIG. 12C is a schematic illustration of an alternate distribution of light sources in a prismatic structure.

FIG. 12A shows a plane view of an example square right prism with a distribution of light sources 312 at the back end 804. The side walls 1220a, 1220b, 1220c, and 1220d of the prism are mirrors. Each of these mirrors reflects light from each object in front of it, creating a corresponding virtual image behind it, this virtual image constituting the reflection of the object. Thus, with reference to FIG. 12B, for light source 1230 there are reflections 1230a, 1230b, 1230c, and 1230d, representing virtual light sources reflected in mirrors 1220a, 1220b, 1220c, and 1220d, respectively. The virtual images produced by reflection are illustrates in FIGS. 12B and 12C with dotted lines.

Additionally, virtual images of the mirrors are formed in the other mirrors. For example, reflected in mirror 1220a are virtual images 1230b, 1230c, and 1230d of mirrors 1220b, 1220c, and 1220d, respectively. Moreover, the virtual images 1230b, 1230c, and 1230d (of mirrors 1220b, 1220c, and 1220d, respectively) themselves include virtual images of the other real and virtual mirrors and light sources (not shown in FIG. 12B).

Shown in FIG. 12C is a set of virtual images of light sources and mirrors, which extends ad infinitum, with each virtual light source having substantially the same intensity as the corresponding real light source (reduced slightly by imperfect mirror reflection). Accordingly, the light distribution at the viewing surface 810 remains substantially uniform, if the mirror 1220a of FIG. 12B is removed, while real mirrors 1240a, 1240b, and 1240c are positioned at the location of former virtual images 1222b, 1222c, and 1222d, and the virtual light source 1230a is replaced with a real light source 1250 equal in intensity and wavelength to the real light source 1230. This arrangement forms a new prism with twice the cross sectional area as the original prism. If the viewing surface 810 is extended across the new prism, then the extended viewing surface will have a distribution of light with the same intensity as the original viewing surface, without increasing the length of the prism.

By generalizing this process, it can be seen that light sources distributed in a single square can be extended to an arbitrarily large grid of squares provided that the light sources in squares of the grid are symmetric by reflection across the respective boundaries with those in adjacent squares. Uniformity at the viewing surface will be retained, provided that the distance from the back surface to the front surface is not less than about four times the side of a single grid square. Moreover, this symmetry argument can be extended to include rectangular grids and grids of regular triangles and hexagons, and other shapes wherein the mirror walls form an infinite grid of virtual mirror walls.

The display surface 810 includes a diffuser that scatters the incident light into a substantially 180-degree Lambertian distribution. The display surface 810 also includes light absorbing material and anti-reflection material to enhance the display contrast. Such enhanced display contrast permits display of dark colors in a bright environment, for example.

In an alternate embodiment of the invention, the display contrast is further enhanced by mounting the LEDs 312 on a circuit board, which is substantially black. The substantially black circuit board absorbs ambient light that may enter the device through the viewing surface 810 and prevents the ambient light from being reflected back to the viewing surface.

In one embodiment, the mirror walls 802 are metallic, for example aluminum films deposited on a plastic surface. In another embodiment, the mirror walls are dielectric multi-layer interference reflectors.

In an alternate embodiment, the prism 800 is a solid block of transparent material, such as acrylic with reflective material (metal or dielectric) applied to the walls 803. In this embodiment diffuse material may be applied to the end surfaces including the front 810, and the diffuser 806. Alternately, the end surfaces may be treated to impart diffusing properties, such as by etching.

The prismatic structure is advantageous over the spherical designs because its non-spherical shape does not have walls that protrude beyond the effective dimensions of the viewing window. The light throughput may also be higher than in other designs where there are multiple reflections off of diffuse surfaces (such as the inner and outer spheres). Also, multiple units can be positioned adjacent to each other, enabling side-by-side presentation of multiple colors. In particular, prisms with 3, 4, or 6 sides, without limitation thereto, are advantageous for such presentations. The number of sides, as well as the dimensions of the sides determines perimeter of the prismatic structure.

In an alternate display 820, shown in FIGS. 8C and 8D, LEDs 312 may be positioned adjacent opposing walls 803 of prismatic structure 800 shining toward the back surface 822 of the display. Back surface 822 may include sloping or rounded walls 824 and/or an impinging surface 668, preferably symmetric about the plane P between walls 803, to generate a more uniform distribution of light on viewing surface 810. Sloping walls 824 tend to increase the light at the perimeter regions of viewing surface 810, whereas impinging surface 668 tends to increase the light in the center of the viewing surface. The reflective surfaces 802, 824, and 668 are preferably white diffusely reflecting surfaces, but may also include specular mirrored surfaces. Impinging surface 668 may be semi-cylindrical with a circular cross-section as shown in FIGS. 8C and 8D, but may also have a parabolic or other cross-sectional geometry, or may be spherical as shown in FIG. 6C.

Display 820 is advantageous over prismatic structure 800 alone in that more area is available at the sides for positioning light sources than at the bottom. The structure, as shown in FIG. 8D, retains the benefit, however, of enabling side-by-side displays of multiple colors, although only a line or such displays can be formed, rather than a 2-dimensional array.

Although back surface 822 may be rectangular, as shown in FIG. 8D having a width extending a distance D from only two of the four walls 803, back surface 822 may have a geometric shape identical to the viewing surface 810, but extending distance D from each of the walls. In such an embodiment, the light sources may be distributed along the annular region between the walls of the prism and the perimeter of the back surface. The back surface may instead be spherical or parabolic. Thus, the display may resemble that of FIG. 6C, except that instead of inner sphere 662, a prismatic structure 800 such as shown in FIG. 8 is mounted concentrically with LEDs 312. Shield 666 may not be necessary in such an embodiment, depending upon the length of prismatic structure 800.

Monolithic Embodiment

Figure 9A:
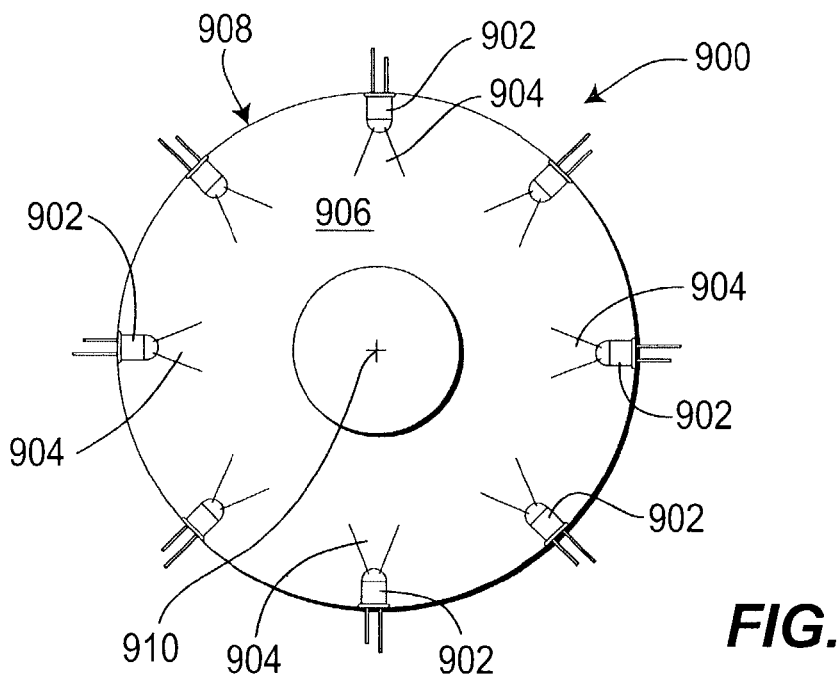
FIG. 9A is a plan view of an exemplary monolithic display apparatus of the invention.
Figure 9B:
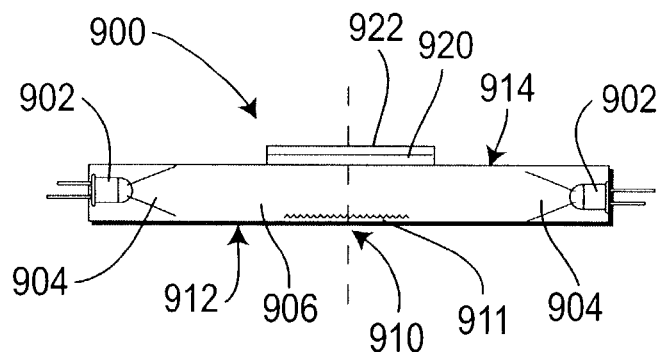
FIG. 9B is a cross sectional view of the display of FIG. 9A.

In another embodiment, the means for combining the modulated narrow-band radiation signals comprises a display apparatus shown in FIG. 9. The multi-wavelength radiation source for display 900 comprises a plurality of narrow-band radiation sources 902, each providing a respective one of the narrow-band radiation beams 904. Although shown with only eight sources 902 for simplicity, it should be noted that the display may comprise any number of sources, including multiple sources for each wavelength band. Thus, for example, a display using four wavelength bands may include three of each type LED, for a total of twelve sources. Preferred embodiments using eight to ten wavelength bands may have twenty-four to forty sources, or more, altogether. The multiple sources of the same wavelength band are distributed symmetrically about the display. Although a single source is shown in each location in FIG. 9A, multiple sources of different wavelength bands may be bundled together at each location.

Display 900 comprises a light-conducting sheet 906 having a periphery 908, a viewing surface 910, a backside 912, and a front side 914. The plurality of narrow-band radiation sources are distributed about the periphery 908 of sheet 906 and are adapted to emit radiation 904 toward center 910. The region 911 of the backside 912 which lies opposite the viewing surface 910 has a roughness sufficient to reflect the radiation 904 toward the front side 914 for viewing. Sheet 906 preferably comprises a monolithic structure comprising polycarbonate or polymethylmethacrylate having a circular or polygonal shape. A neutral density filter 920 of radially varying transmission may be attached to the front side 914 of sheet 906 as shown in FIG. 9. A sheet 922 of microlenses or a hologram may also be attached to viewing surface to direct light as needed.

Reference Colors

When the human visual system sees a color, seeing the color with respect to different colors may change the perception of the color. For example, red hues seen next to green hues may appear different to the human eye than red hues seen next to orange hues. Thus, it may be desirable to incorporate into the display means for displaying a reference color adjacent to the display, such as frame surrounding the display. A useful reference color is gray. The reference frame can be illuminated by LEDs or other light sources capable of providing the desired shade of gray corresponding to different types of lighting, such as incandescent or daylight. These various types of lighting are referred to herein as environmental lighting. Alternatively, a white display surround may be used to provide similar results as gray, or any color surround desired may be used.

Figure 11:
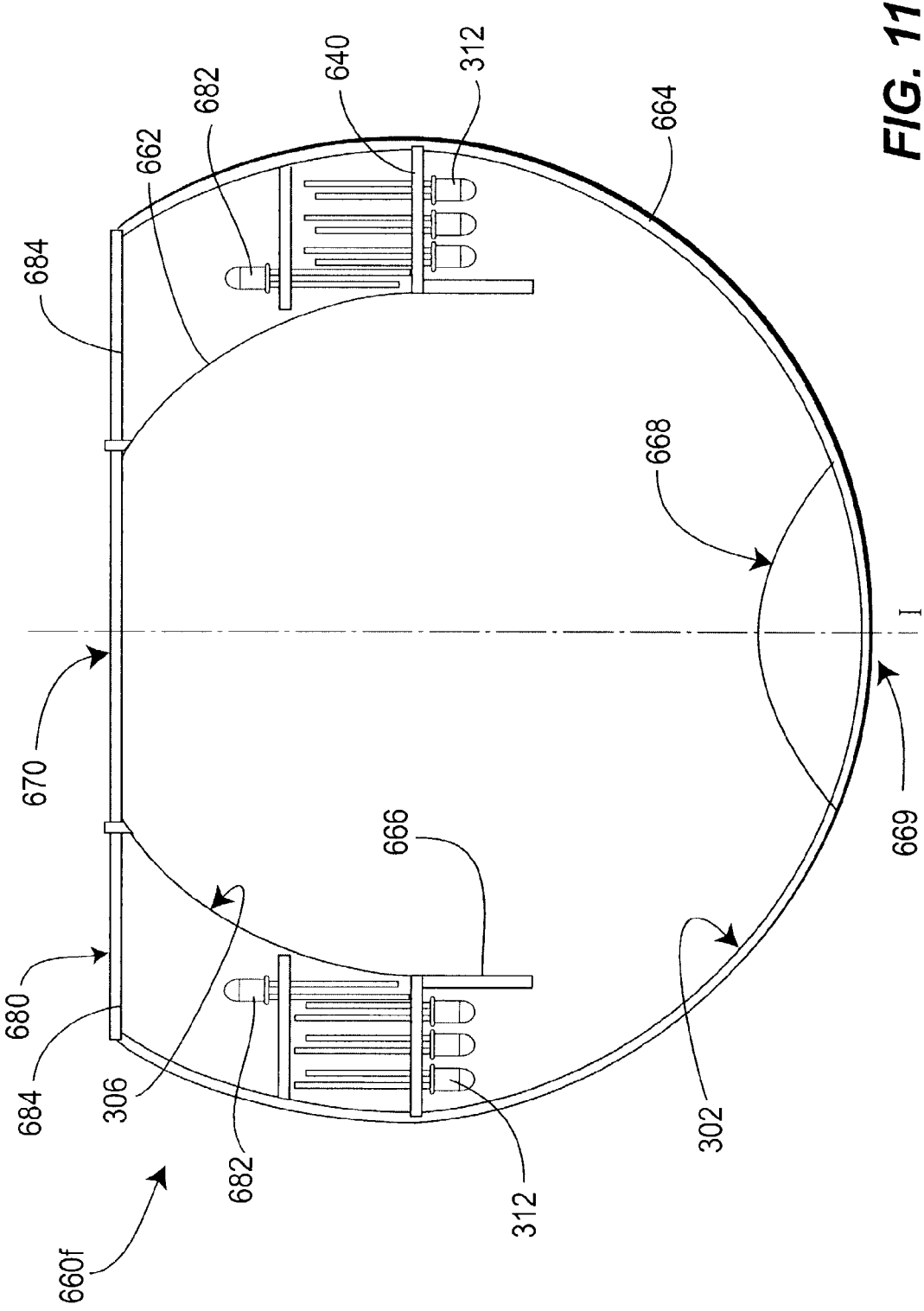
FIG. 11 is a schematic illustration of an exemplary display apparatus of the invention having only a partial inner sphere extending from the viewing window.

Referring now to FIG. 11, there is shown display embodiment 660f similar to the embodiment 660 shown in FIG. 6C, further comprising a reference frame 680 about viewing window 670. All of the other components are as shown and described for FIG. 6C. Reference frame 680 comprises one or more frame lamps 682, such as LEDs as shown, distributed about the frame area, preferably in a symmetrical fashion, and a diffuse surface 684 through which the light from lamps 682 shines. Lamps 682 may be white or a mix of red, green, and blue or other colors. The combination of lamps 682 and diffuse surface 684 produce the desired shade of reference color. Interchangeable diffuse surfaces 684 and/or interchangeable lamps 682 can be used to vary the reference color, or a plurality of lamps 682 of different shades may be provided, with controls to select the desired lamps and the respective intensities thereof to provide the desired reference shade or color. Although shown with respect to display 660, the reference frame can be added to any of the other display embodiments shown herein. Baffles (not shown) between the lamps 682 and diffuse surface 684 and/or additional diffusers (not shown) over or under the diffuse surface may be added, as desired, such as to produce uniform light from the reference frame.

Texture

In viewing colors with the displays of this invention, it may also be desirable to view the colors with respect to a texture. This enables the color to be observed in conjunction with the material texture, which is useful for applications where the textural aspect of the material is important. Two-dimensional images of textured surfaces can be generated by photographing textured objects, or by other means of imaging such as xerography. Patterns of color that also possess the appearance of texture can be generated by superimposing such images on the color display. Referring now to FIG. 6A, this superposition can be accomplished, for example, by placing a gray-scale transparency 360 of such a texture image over the otherwise uniform color display surface. The texture image can be a fixed pattern, for example on a printed transparency, or a programmable pattern, for example a transmissive liquid crystal display. The patterns may be derived by scanning an actual sample of textured material.

Figure 10:
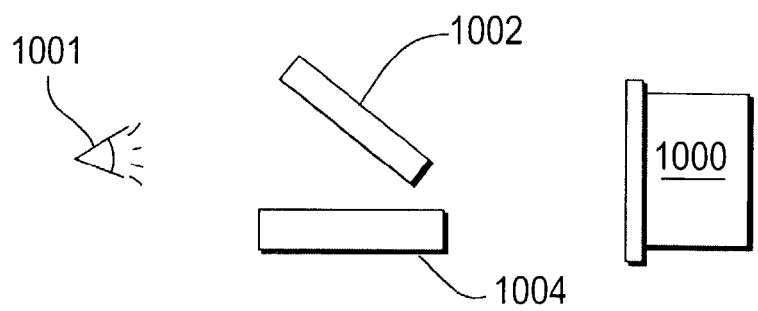
FIG. 10 is a schematic illustration of a display of this invention projecting the light onto a reflective, transmissive, and/or textured surface.

In another technique for superimposing texture, as shown in FIG. 10, display 1000 may be viewed by a user 1001 through a partial mirror 1002 which allows transmission of the color shown on display 1000 but also superimposes the reflection of image 1004. Image 1004 may be an actual sample of the textured item that is illuminated to produce the image reflected by partial mirror 1002, a reflective or transmissive liquid crystal display, or an illuminated image on paper or a back-illuminated transparency. The advantage of this method is that rather than subtracting light, as a transmissive LCD or transparency over the display does, this embodiment superimposes the image on the color coming from the display.

Rather than merely showing a textured material, a transmissive display positioned in front of the viewing surface (such as element 360 in FIG. 6A) or reflected onto a partial mirror 1002 as shown in FIG. 10, may comprise an imaging system. The reflective or transmissive display may be a liquid crystal display (LCD). Thus, the imaging system may allow consideration of the color as it would appear on a car, or a chair, or the like.

Feedback Control

Preferred embodiments of the device include feedback control means 224 as shown in FIG. 2. The radiation at display device 220 may be sampled by a monitoring device 223, such as light sensor or a spectrometer connected to a control computer. If desired, the wavelength and/or intensity of each beam can be sampled, for example, by briefly energizing and sensing one beam at a time. This sampling provides feedback and provides improved control of the radiation intensity in the different radiation beams, to more precisely provide the desired spectrum at the display device. The spectrometer sampling may also utilize optics including mirrors, lenses, gratings, and fiber optics.

Thus, the various displays embodiments of this invention may further comprise a color control system 210 comprising a controller 230 that receives operator input or external input 232 regarding the color to be displayed, means 223 for monitoring characteristics of the radiation emitted from the radiation source at one or more wavelengths; feedback means 224 for comparing the monitored characteristics to a desired set of characteristics and adjusting the feedback signal 226 to the intensity modulator 214 to provide the desired set of characteristics on display device 220. The monitoring means may comprise a photosensor, such as a PIN diode, or a spectrometer that enables independent monitoring of the intensity. The output of monitoring means can also be provided to the controller 230.

The intensity modulator 214 may comprise drivers, such as transistors, that provide regulated current to each light source of the radiation source 216. The intensity modulator may include a microcontroller to process the input signal 212 and the feedback signal 226 and to control the drivers, optionally with digital/analog converters to enable the output of the microcontroller to drive the transistors. The intensity modulator 214 receives input 212 indicating the desired intensity of each of the plurality of wavelength bands. This input 212 comes from a controller 230, such as a personal computer, such as by means of a serial or parallel encoded link. The personal computer may include software to translate operator desires into appropriate coded signals. Alternately, the functions of the controller can be included within the intensity modulator. The intensity modulator 214 further receives feedback signals 226 from the feedback control 224 and the monitoring device 223, indicating the total intensity of displayed light (in the case of a total light level sensor such as a PIN diode or other type of photosensor) or the intensity as a function of wavelength (in the case of a spectrometer). The microcontroller compares the monitored intensity with the desired intensity and adjusts the level of power to each light source as needed to minimize the difference between the actual and desired level. The level of power to each light source can be adjusted either by adjusting the magnitude of the current supplied to the light sources (current modulation) or by adjusting the duty cycle of the current (pulse-width modulation), or by a combination of these two adjustments.

If a total light level sensor is used as the monitor, the light sources may be excited individually, at least for a brief time, to determine the intensity level of each wavelength. They may all be de-excited briefly to allow the reading of a background level. If this background level results from ambient light which is present in the vicinity of the device and which enters the device through the display surface, the background reading can indicate the color characteristics of the ambient. The ambient can be removed from the background by covering the display surface, for example by a manual operation on the part of the operator or by automated operation using a shutter device (not shown). The monitoring device can therefore provide information 228 to the controller 230 to aid in determining the proper excitation characteristics, which characteristics can depend on the characteristics of the ambient light. Both LEDs and photosensors, such as PIN diodes, have the advantage of a very fast response time: LEDs reach their full output in a small fraction of a microsecond, and photosensors such as PIN diodes respond to the light level and a small fraction of a microsecond. Thus, each of the LEDs can be excited individually and their outputs monitored in only a few microseconds, or they all can be de-excited and the background monitored in only a few microseconds—sufficiently fast as to be unapparent to the viewer. This time during which the monitoring takes place is referred to as the "sampling period." The light emitted during the short sampling period is likely to be negligible compared to the desired light level.

The microcontroller can be programmed, however, to include the light emitted during the sampling period as part of the total emitted light, if desired.

The microcontroller may be programmed to estimate the fraction of time that each LED must be on to provide the desired level of light for the display. The microcontroller can then turn the LEDs on at the same drive current as used during the sampling period for the desired fraction of the display period. If the microprocessor drive clock has a period of 1 microsecond, and control is desired at the level of 0.1%, then the display period can be as short as 1 millisecond. The sampling period and display period can therefore be repeated at a very fast rate, on the order of a millisecond, much faster than can be sensed by the human eye. Thus, the display will appear to be of a constant color despite the actual on/off cycling of the LEDs.

The controller 230 can comprise a personal computer under control of an operator, with interface software that enables convenient specification of the color to be displayed. Alternately, or in addition, it can include an external interface 232 that enables remote control of the color to be displayed, by a communications means such as a serial link, an Ethernet link, or the internet. This communications means allows display of color by operators in remote locations, and display from remote color databases.

Applications for Colorant Mixing Simulation

One application of the present system is for providing electronic simulation of color produced by mixing different colorants, such as pigments or dyes, such as used in colored paint, plastic, textiles, and cosmetics. Typically, colorants, such as white, black, red, yellow, blue, green, and others, are mixed together according to a recipe that provides the desired color. Each colorant has characteristic optical properties, such as absorption and scattering, that result in its color. When colorants are combined, the spectrophotometric curve of the color can be predicted from the linear combination of the colorant's optical constants at each wavelength. One method of predicting the spectra is to use the well-known Kubelka-Munk equations.

$$R = \frac{1 - R_g(a - b \cdot \coth(bSX))}{a - R_g + b \cdot \coth(bSX)} \quad (1)$$

Where: R=reflectance of the colored film of thickness X $a = 1 + (K/S)$ $b = \sqrt{a^2 - 1}$ K and S=absorption and scattering coefficients of the film
$R_g$=the reflectance of the background For completely opaque materials, the following equation may be used instead of Equation 1:

$$\frac{K}{S} = \frac{(1 - R_\infty)^2}{2R_\infty} \quad (2)$$

Where $R_\infty$=reflectance of a sample of infinite thickness to light of a given wavelength, expressed in fractional form.

The absorption and scattering coefficients of a colored material can be determined by the combination of the absorption and scattering coefficients of the individual pigments or dyes used to color the material using the following equation:

$$\frac{K}{S}(\text{mixture}) = \frac{(c_1 K_1 + c_2 K_2 + c_3 K_3 + \ldots + K_S)}{(c_1 S_1 + c_2 S_2 + c_3 S_3 + \ldots + S_S)} \quad (3)$$

Where c=concentrations of colorants
K=absorption coefficients
S=scattering coefficients
subscripts 1,2,3, etc. identify individual colorants
subscript s identifies the substrate, or for many pigment applications it may identify the white pigment (opacifier) used in the material.

In addition to creating an accurate color display, one embodiment of the invention may also allow the user to obtain a spectrophotometric curve that is a digital description of the color on the display. Such reflectance curve is useful in formulating pigment or dye mixtures that will match the color of the display. Because reflectance is not linear with respect to colorant (dye or pigment) concentration, it is desirable to use a function of reflection that is linearly related to colorant concentration, such as the Kubelka-Munk function.

In one embodiment of this invention a display is used to create a color by a first user. The color display, or means such as a computer connected to the display, may be manipulated to generate a desired color on the display. Electronic information about the color may be transmitted using communication means to a second user. For example, in one application the color may be selected as an interior wall color and the settings for the color display may then be sent electronically directly to a paint maker or mixer. The paint maker or mixer receives the electronic color information on their own display. The display itself, or a computer or other means in communication with the display, may generate the spectrophotometric curve corresponding to the color on the display so that the paint maker or mixer may use with a color matching system to determine the correct pigments and corresponding concentrations to match the color on the display.

The spectrophotometric curve may be interpolated for any wavelength across the useful spectrum. For example, typical color matching software may characterize the absorption and scattering constants for each colorant in 10 or 20 nm increments in the wavelength range between 400 and 700 nm, generating data at 16 or 31 wavelengths from which a curve can be interpolated. The displays of the present invention may use a multiplicity of light sources (preferably at least four, more preferably seven or more, and even more preferably a range of eight to ten) to create the color on the display. Thus, the curves of spectrophotometric constants may be generated for each colorant using a first number of data points, and converted for use with the appropriate number of light sources used by the display.

In another embodiment of the invention the system may incorporate user specific example the optical constants K or S values. For example, when generating a color, the system will access colorants in a data file of the particular company manufacturing the colored product. In this manner, the display creates only a color that can actually be matched with the available colorants. Other embodiments of the invention may comprise software that incorporates limits of the spectrophotometric curve and tristimulus values that may be matched by the available pigments. The software may limit the generation of colors on the display to only those colors that can be matched using the available pigments. A desired illuminant, such as daylight of incandescent light, may also be taken into account in generating the optical properties for the colorants and in displaying the color that can actually be produced by mixing such colorants.

Thus, an embodiment of this invention may be used for displaying colors that are produced by mixing various colorants together. The known optical properties of the colorants may be stored as data in a computer memory means. The optical properties may be additively combined to produce a desired absorption spectra (i.e. color). The display or a computer associated with the display may comprise means for reading the stored data and means for combining the optical properties of one or more colorants in response to user input. The display or computer may further comprise means for generating the input signal representing intensities of the wavelength bands for producing emission spectra on the display surface corresponding to the combination of colorants. The display may further comprise means for adjusting the emission spectra to take into account a desired illuminant, such as for example daylight or incandescent light, for the available colorants for a particular application. Thus, only spectra that can actually be produced by the colorants in a particular system (paint, plastic, etc.) will be displayed.

Communication Applications

Another embodiment of the invention may further comprise a communication means for interfacing with a computer network. The communication means may include computer and internet communications, whereby collaborating participants can indicate and view the spectrum displayed or desired to be displayed with confidence that others in remote locations are seeing exactly the same spectrum. In one embodiment a display apparatus is attached to a computer through a standard interface such as a serial port or Ethernet connection. Utilizing the interface, the computer can specify to the device one or more colors to be displayed. Using the internet or other computer-to-computer communication means, a user with a computer can search databases of spectrophotometric data corresponding to available color choices from one or more suppliers of material associated with such colors, such as pigments, dyes, paints, and plastics. An accurate color rendition generated from the data may then be displayed on the display device attached to the computer. Likewise, using computer-to-computer communication means, multiple participants can collaborate on the selection or specification of a color.

The means of interaction may include taking spectrophotometric measurements of physical samples and transmitting the colors to participants, searching databases and sharing search results, on-line discussion of color attributes, or any other form of collaboration in which a common viewing of an accurate color rendition by multiple geographically separated parties facilitates a business or personal color selection process.

As with the communication of data, the communications can be encoded to prevent unauthorized interception. The communications can be to and from one or more database servers that receive spectra, provide storage of spectra, and transmit spectra to specific or to general authorized users. That is, a color spectrum provider can specify that a spectrum be available only to a specific user, or can be generally available to any user that requests it. A fee may be charged for any or all of the capture, storage, search, transmission, reception and/or viewing time associated with a particular spectra.

The invention provides a number of display devices, particularly useful for specifying, measuring, displaying, and communicating colors with reduced metameric confusion. The devices can be used to display colors of specified spectra, produce illumination with a specified spectra for observing color samples, and communicate with similar systems to enable similar display and measurement at remote sites. The user can alter the displayed color to produce a new color to his liking. The computer used for control can also be used communicate with remote sites and to control the display of colors on similar display apparatus at remote sites, and to enable the control of the locally displayed spectrum from remote sites. Such communication may be over dedicated telephone lines, local area networks, or wide area networks.

The color display may comprise a connection to a distributed computer network, such as the Internet. The communications can be encoded to prevent unauthorized interception. The communications can be to and from one or more central servers that receive radiation spectra, provide storage of spectra, and transmit spectra to specific or to general authorized users. That is, a radiation spectrum provider, such as a supplier of paints or other colored finishes, can specify that spectra are available only to specific users, such as specified customers, or are generally available to any user that requests it. A fee can be charged for the reception, storage, and transmission of radiation spectra.

Alternatively, the server can contain a library of spectra of illumination sources and software for calculating a radiation spectrum from a reflectance spectrum. The user supplies the server with the reflectance spectrum, such as the reflectance spectrum of a proposed automotive finish. The server calculates the radiation spectrum for the proposed finish under different light sources, such as sunlight, incandescent light, fluorescent light, and sodium vapor light. The server calculates input signals for the color display and transmits the signals to the color display. The color display displays the color as it appears under different types of illumination. In a commercial embodiment, the input signals for a large number of finishes under several different light sources may be predetermined and stored as descriptors. Each descriptor representing the input signals for a respective color in a respective finish when viewed under a respective light source. A customer may select a color finish and light source and have the resulting color displayed, either as a single color or as a portion of a scanned full-color image. This may be especially useful in cases in which it is desired to match the appearance of a color under a number of different types of illumination, such as, for example, in the automotive refinish business. This service may be provided for a fee.

Although the invention has been particularly shown and described with reference to certain preferred embodiments, those skilled in the art will appreciate that various modifications and changes in form and details may be made without departing from the scope of the invention.

For example, in the preceding description specific details are set forth to provide a more thorough understanding of the invention, but it will be apparent to those skilled in the art that the invention may be practiced without using these specific details.

What is claimed is:

1. A method for displaying a mixed color produced by mixing a plurality of individual colorants in a predetermined ratio, the method comprising the steps of:
   (a) providing a radiation spectrum for a color produced by each individual colorant;
   (b) dividing the radiation spectrum into at least four wavelength bands;
   (c) determining an intensity for each wavelength band;
   (d) transmitting the intensities to a radiation source;
   (e) selecting a narrow band of wavelengths in each of the wavelength bands;
   (f) generating a multiplicity of beams of radiation, each beam of radiation essentially corresponding in wavelength to a selected narrow band of wavelengths and corresponding in intensity to the respective wavelength bands; and
   (g) combining the beams of radiation to display the color.

2. A method of remotely displaying a color comprising,
   (a) providing a radiation spectrum for a color produced by each individual colorant;
   (b) transmitting the radiation spectrum to a remote location to display the color;
   (c) dividing the radiation spectrum into at least four wavelength bands;
   (d) determining an intensity for each wavelength band;
   (e) generating a multiplicity of beams of radiation, each beam of radiation essentially corresponding in wavelength to one of the wavelength bands and corresponding in intensity to the respective determined intensity; and
   (f) combining the beams of radiation to display the color.

3. The method of claim 2 further comprising accessing an electronic database of spectra.

* * * * *